Figure 1:
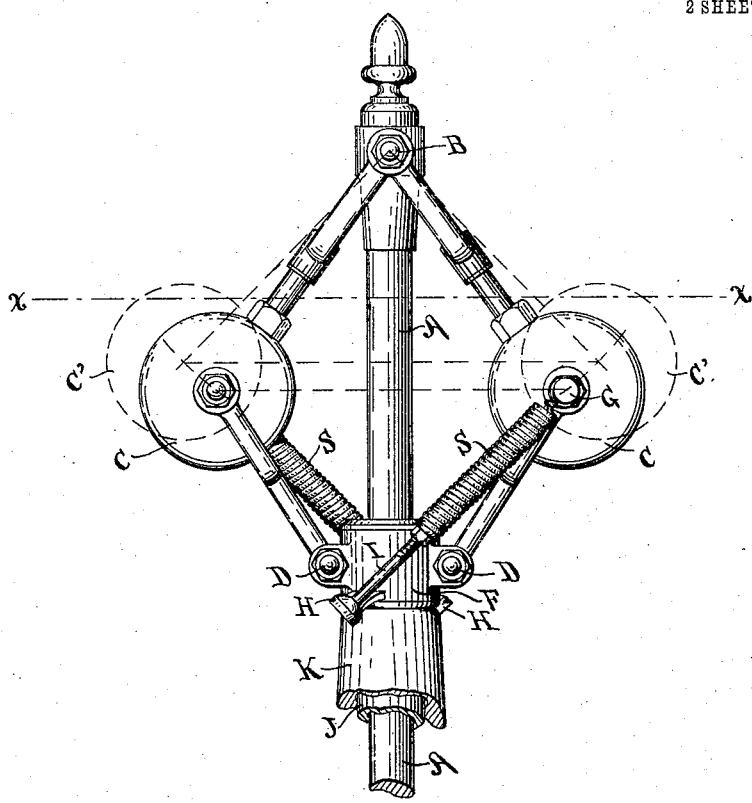

PATENTED JAN. 3, 1905.

D. W. PAYNE.
ENGINE GOVERNOR.
APPLICATION FILED APR. 22, 1904.

2 SHEETS—SHEET 1.

WITNESSES:
M. E. Verbeck
Lewis Diven

INVENTOR
David W. Payne.
BY
Eugene Diven
ATTORNEY

No. 779,373. PATENTED JAN. 3, 1905.
D. W. PAYNE.
ENGINE GOVERNOR.
APPLICATION FILED APR. 22, 1904.

2 SHEETS—SHEET 2.

WITNESSES:
M. E. Verbeck.
Louis Diven

INVENTOR
David W. Payne
BY
Eugene Diven
ATTORNEY

No. 779,373.

Patented January 3, 1905.

UNITED STATES PATENT OFFICE.

DAVID W. PAYNE, OF ELMIRA, NEW YORK, ASSIGNOR TO SARAH K. PAYNE, OF ELMIRA, NEW YORK.

ENGINE-GOVERNOR.

SPECIFICATION forming part of Letters Patent No. 779,373, dated January 3, 1905.

Application filed April 22, 1904. Serial No. 204,406.

*To all whom it may concern:*

Be it known that I, DAVID W. PAYNE, a citizen of the United States, residing at Elmira, in the county of Chemung and State of New York, have invented a certain new and useful Improvement in Engine-Governors, of which the following is a specification.

This invention relates to improvements in ball-governors; and my object is to provide an arrangement of centripetal springs whereby a governor of this type without being made isochronous will be given the closest possible approach to that condition consistent with good regulation of the controlling mechanism.

My improvement is based on the principle that the difference in moments of the weights between their maximum and minimum positions shall always be greater than the difference between the spring moments for the same position. The application of this principle to a fly-wheel governor has already been described in my Letters Patent No. 735,408, dated August 4, 1903.

My present invention consists in establishing such a relation between the weights and the springs in a ball-governor as to comply with this condition and to also arrive at the closest approach to equilibrium between the centrifugal moments of the weights and the centripetal moments of the springs consistent with the closest possible regulation of the machine under control. To accomplish this end, the moments of the weights must always increase in passing from minimum to maximum positions and the tension of the springs when at rest must be a definite function of their extension, as will be hereinafter more fully set forth.

In a pendulum-governor of the Watt type the angular velocity is dependent upon the relation between the height of the point of suspension above the centers of gravity of the weights and the radius of the path described by the centers of gravity and is determined from the formula $v = r\sqrt{\frac{g}{h}}$. This is always low unless the pendulum-arms are very short. With the usual length of arms changes in the height of the balls occur slowly, and with short arms the range of movement is greatly reduced. In either case too great a change in angular velocity is required for close regulation. This condition is largely removed by supplying centripetal resistance by means of a weight or springs tending to restrain the balls toward their minimum path.

Spring-loaded governors are the only ones with which this improvement has to do. In any form of spring-loaded ball-governor let $a$ and $a'$ represent the centrifugal moments at the minimum and maximum positions of the balls, respectively, and let $d$ and $d'$ represent the lever-arms of the springs at corresponding positions. Let X equal the initial tension of the spring, E equal the extension of spring due to the expansion of the balls, and S equal the scale of the spring. Then the spring moments at the minimum and maximum positions will be, respectively, $S d X$ and $S d' (X+E)$. Since the difference between the centrifugal moments is by my construction to be made greater than the difference between the spring moments, we have (1) $a' - a > S d' (X + E) - S d X.$ At the maximum position the centrifugal and spring moments must be equal. Therefore $S d' (X + E) = a'$, which gives $S = \dfrac{a'}{d'(X+E)}$. Substituting this value for S in (1) and resolving for X, we get (2) $X > \dfrac{a\, d'\, E}{a'\, d - a\, d'}.$ My invention is therefore based upon the above formula, due allowance for friction being made in applying the formula, and in order to explain the application thereof to a ball-governor I will have reference to the accompanying drawings, in which—

Figure 2:
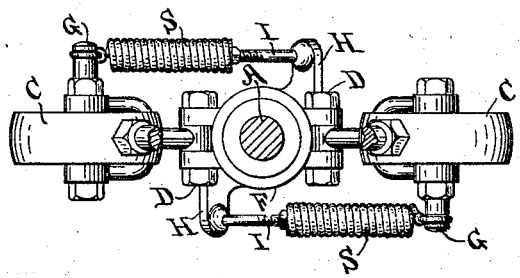

Figure 1 represents a side elevation of one type of Watt governor with my improvement applied thereto; Fig. 2, a plan view of the same with the upper part cut away on the line $x\, x$ in Fig. 1, and Figs. 3, 4, and 5 diagrams to illustrate the application of my principle.

Figure 3:
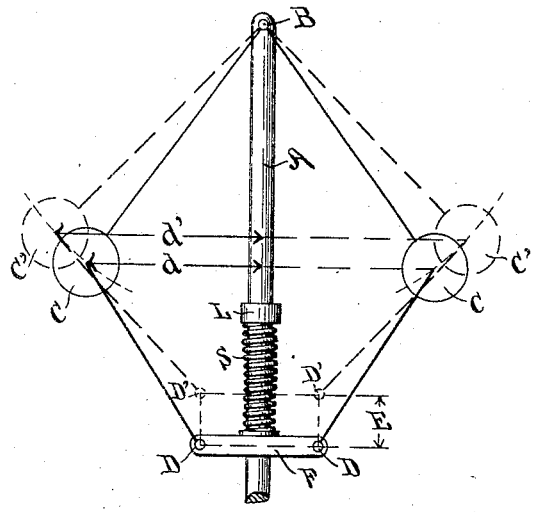

Referring first to Fig. 3, this illustrates in skeleton form the usual type of Watt governor, in which A represents the revolving spindle; B, the point of suspension of the weights or balls C C, said balls being represented by full lines in their lowest or minimum positions and by broken lines at C' C' at their highest or maximum positions. The balls C are coupled at D D by links to a revolving and sliding yoke F, by which the valve-adjusting mechanism is actuated. D' D' represent the positions of these points of link attachments when the balls are at their maximum positions. S represents a spring which is compressed between the sliding yoke F and a fixed collar L on spindle A when the balls are thrown out. E represents the distance through which the yoke F rises on the spindle A as the balls pass from minimum to maximum position, or, in other words, the amount of compression of the spring due to the movement of the balls. $d$ is the radius of the path described by the balls in their lowest position, and $d'$ the radius for their highest position, and these radii are the same as the lever-arms for the spring moments, which act upon the weights about the center of suspension B. If the values for $a$, $a'$, $d$, and $d'$ derived from this arrangement are substituted in the formula 2, we will find that $a'd < a d'$ and that therefore X will become a negative quantity. Hence this type of spring-loaded governor in which the line of spring action is coincident or parallel with the axis of the spindle will not comply with the principle enunciated, and it is immaterial whether the spring is one of compression or extension.

Figure 4:
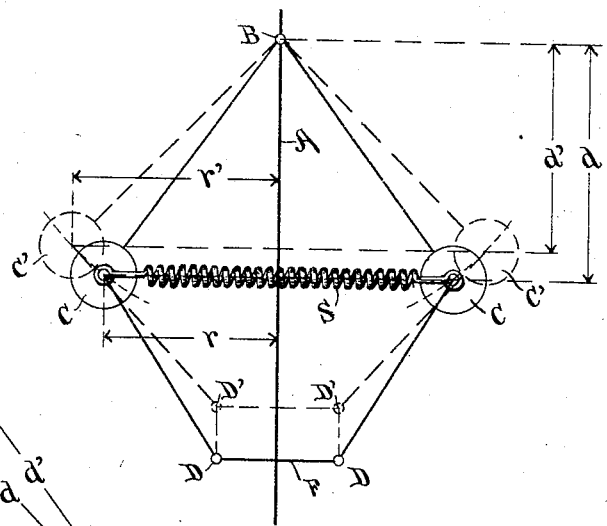

In Fig. 4 I have represented another usual arrangement of spring attachment for this type of governor, in which the governor-balls are connected together by springs which lie at right angles to the spindle. In this arrangement the lever-arms of the centrifugal and spring moments will be the same, being represented by $d$ and $d'$ in the minimum and maximum positions of the weights, and it will be evident that the extension of the spring due to the movement of the balls will be equal to $2(r'-r)$. The initial tension of the spring in ordinary cases where the spring is so attached will be about 4E and will be so great as to exhaust the possible capacity of the spring. For instance, where by the scale to which the diagrams are drawn we have $r=5.34$ inches, $r'=6.42$ inches, $d=7.24$ inches, and $d'=5.37$ inches E will equal 2.15 inches, and applying the formula we will get X = 8.8 inches, which makes the total length of extension 10.95 inches. This is greater than the distance between the centers of the weights at their lowest position, since $2r=10.68$ inches, and my formula cannot, therefore, be applied to a governor with this arrangement of the spring.

It is immaterial whether the governor has the auxiliary links connected to a yoke sliding on the spindle or not. Any method of attaching the springs whereby the axis of the spring is parallel with or perpendicular to the axis of revolution will be found incompatible with the requirements of my formula.

It will appear from an inspection of formula 2, giving the value of X, that the initial tension of the spring is a function of the extension of the spring and that, therefore, in order to keep X within the limits of ordinary construction the extension E must be kept as small as may be without necessitating too powerful springs. In Figs. 1 and 2 and the diagram shown in Fig. 5 I have illustrated how springs may be attached to a ball-governor to derive the proper spring tension to comply with the requirements of my formula.

In Figs. 1 and 2 I have shown a construction of governor which is much in use and have applied thereto the centripetal springs in such manner as to bring this governor within the requirements of my formula. In the figures, A represents the driving-spindle; B, the point of suspension of the weights C C, the extreme position of the weights being indicated at C' C'. These weights are coupled by links at the points D to the revolving yoke F, which also slides up and down upon the spindle A as the weights expand and contract, said yoke carrying with it the hollow spindle J, which actuates the valve-setting mechanism. K represents the stationary standard for the governor. The springs S are coupled at one end to the weights at the points G and at the other end to arms H, projecting out from the yoke F in such positions as to place the springs at an angle to the axis of rotation, I I represent the adjusting-stems for the springs, which are loosely mounted in cup-shaped sockets in the arms H for the purpose of setting up the springs to the required tension when adjusting the governor.

Figure 5:
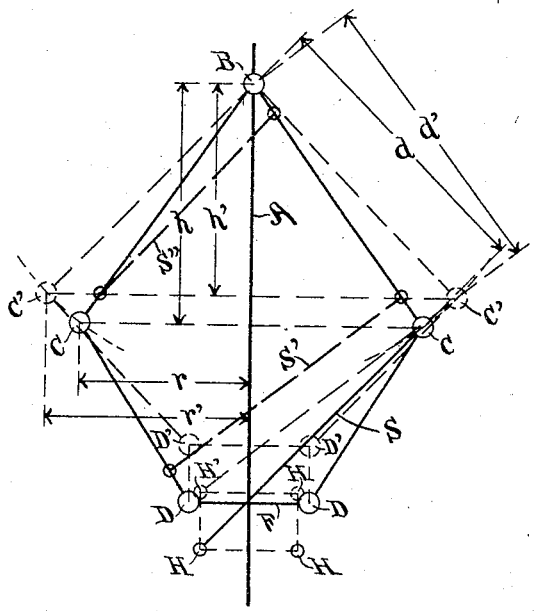

By referring to Fig. 5 we will have, as before, $r=5.34$ inches, $r'=6.42$ inches, $h=7.125$ inches, and $h'=6.31$ inches; but $d$ will now be found to equal 8.88 inches and $d'$ so little different that we may call them the same. The extension of the spring, owing to this arrangement, is very small—in fact, E=0.187 inches. Substituting these values in the formula 2, the values of $a$ and $a'$ being the same as derived for the other figures, we get X=2.034 inches, which is entirely within practicable limits.

It will be noted that by reason of attaching one end of the springs to the sliding yoke and the other end to the balls one end of a spring will pass from the point H to the point H' while the other end is passing from the point C to the point C' as the weights pass from minimum to maximum positions. The extension of the springs is therefore less than it would be if the point H were fixed. In other words, there is a differential extension of the spring in passing from the minimum to the maximum position, and to this I attach great importance, as it enables me to apply my formula with greater precision, since this variable extension of the spring, in connection with the variable lever-arms $d$ and $d'$, gives a spring effort having a variable increment, and it is possible to so locate the points of spring attachment that a line plotted to indicate the stress of the spring through its range of action may be curved so as to approach more closely the line representing the centrifugal moments. It is to be understood, however, that these curves must not be brought into coincidence, since if that were to happen the centrifugal and centripetal efforts would be so balanced as to render the governor oversensitive and unstable in action. It is to guard against this that I so arrange the springs as to keep the difference in spring moments less than the difference between the centrifugal moments.

It is not essential that one point of attachment of the spring shall be at the ball and the other at the movable yoke. One point of attachment may be on the auxiliary links and the other at a point distant from the center of the weight, as indicated at $S'$ in Fig. 5, or where there are no auxiliary links the springs may be attached in some such position as represented at $S''$, the differential extension being retained in either case. This differential extension, however, is not essential in the application of my formula within the requirements of the ordinary governor, as in some arrangements of weights and supporting-arms one end of the spring may have to be attached to a point revolving in a fixed path. In this latter arrangement there will be a constant increment in the extension of the spring, for which due allowance must be made in applying the formula.

In applying the springs to any given ball-governor in such manner that the line of spring action will lie at an angle to the axis of rotation I am unable to bring the spring moments within the limits of my formula and to apply said formula so as to meet the different requirements in this type of governor, thereby accomplishing a much closer regulation and control of the valve mechanism than has heretofore been obtainable. I may also apply the differential extension feature as described above to the springs attached to shaft or fly-wheel governors with equally good results, and I therefore do not desire to be limited in this respect to any particular type of governor.

What I claim as my invention, and desire to secure by Letters Patent, is—

1. In a governor, a pivotally-mounted weight revolving about an axis of rotation, means whereby said weight will act to adjust a valve-gear, and a centripetal spring acting upon said weight, said spring being set to rotate in a path inclined to the axis of rotation and being given an initial tension and an extension whereby the difference between the centrifugal moments of the weight at maximum and minimum positions will be greater than the difference between the spring moments for the same positions with reference to the point of suspension of the weight.

2. In a governor, a pivotally-mounted weight revolving about an axis of rotation, means whereby said weight will act to adjust a valve-gear, and a centripetal spring acting upon said weight, said spring being set at an incline with reference to the axis of rotation whereby the spring may be given an initial tension which will be approximately equal to or greater than $\dfrac{a\,d'\,E}{a'\,d - a\,d'}$, in which $a$ and $a'$ are the moments of the weight at minimum and maximum positions, $d$ and $d'$, the lever-arms of the spring efforts at the same position, and $E$, the extension of the spring.

3. In a governor, a driving-spindle, a weight pivotally mounted on said spindle, a sliding yoke on said spindle coupled to and revolving with said weight, means connected with said yoke for adjusting a valve-gear, and a centripetal spring coupled at one end to the weight and at the other end to the yoke.

In testimony whereof I have affixed my signature in presence of two witnesses.

DAVID W. PAYNE.

Witnesses:
 G. M. DIVEN,
 M. E. VERBECK.